(12) United States Patent
Park et al.

(10) Patent No.: US 11,514,042 B1
(45) Date of Patent: Nov. 29, 2022

(54) MANAGING MULTIPLE CACHE SPECIFICATIONS WITHIN A DATABASE ENVIRONMENT

(71) Applicant: SAP SE, Walldorf (DE)

(72) Inventors: Dan Bi Park, Seoul (KR); Jin Uk Bae, Seoul (KR); Jane Jung Lee, Ansan (KR); Yoseob Kim, Seoul (KR)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 17/338,452

(22) Filed: Jun. 3, 2021

(51) Int. Cl.
*G06F 16/2453* (2019.01)
*G06F 16/248* (2019.01)

(52) U.S. Cl.
CPC ...... *G06F 16/24539* (2019.01); *G06F 16/248* (2019.01)

(58) Field of Classification Search
CPC .......................... G06F 16/24539; G06F 16/248
USPC ......................................................... 707/717
See application file for complete search history.

(56) References Cited

U.S. PATENT DOCUMENTS

| | | | | |
|---|---|---|---|---|
| 6,029,175 | A * | 2/2000 | Chow ..................... | H04L 67/02 |
| 2006/0022048 | A1 * | 2/2006 | Johnson ............. | H04M 3/42348 |
| | | | | 707/E17.117 |
| 2009/0031006 | A1 * | 1/2009 | Johnson ................. | G06F 16/958 |
| | | | | 709/218 |
| 2010/0036804 | A1 | 2/2010 | Blamer et al. | |
| 2014/0282586 | A1 * | 9/2014 | Shear ................. | G06F 16/24575 |
| | | | | 718/104 |
| 2014/0310232 | A1 | 10/2014 | Plattner et al. | |
| 2015/0347410 | A1 | 12/2015 | Kim et al. | |
| 2016/0034305 | A1 * | 2/2016 | Shear ...................... | H04L 47/70 |
| | | | | 707/722 |

FOREIGN PATENT DOCUMENTS

| | | | | | |
|---|---|---|---|---|---|
| AU | 2007238099 | A1 * | 10/2008 | ......... | H04L 63/0272 |
| AU | 2013315670 | A1 * | 4/2015 | ......... | H04L 12/6418 |
| JP | 3786722 | B2 * | 6/2006 | ............. | G06F 21/33 |
| JP | 2016146205 | A * | 8/2016 | ............. | G06F 12/00 |

OTHER PUBLICATIONS

Extended European Search Report, European Patent Application No. 21205496.9, 8 pages, dated Mar. 30, 2022.
Oracle Help Center, "TimesTen Application-Tier Database Cache User's Guide 10, Using the Cache Advisor," https://web.archive.org/web/20150919184425/https://docs.oracle.com/database/121/TTCAC/caintro.htm, 23 pages, Sep. 19, 2015 (retrieved Mar. 22, 2022).

* cited by examiner

*Primary Examiner* — Dung K Chau
(74) *Attorney, Agent, or Firm* — Klarquist Sparkman, LLP

(57) ABSTRACT

Technologies are described for managing multiple cache specifications for a single view in a database environment. For example, a plurality of caches can be crated for the single view. Each of the plurality of caches can have a different cache specification. A query can then be received that operates on the single view. One of the plurality of caches can be selected for processing the query based at least in part on the cache specifications. The query can be processed using the selected cache. Results of processing the query can be output.

20 Claims, 14 Drawing Sheets

Figure 2
Prior Art

```
CREATE VIEW VIEWX as (SELECT A, B, C, D, E from TABX);          -- 210

-- no cache spec
ALTER VIEW VIEWX ADD STATIC CACHE RETENTION 10;  -- cache contents: select * from VIEWX (view definition
as it is)                                                        -- 220

-- cache grouping spec
ALTER VIEW VIEWX ADD STATIC CACHE RETENTION 10 OF A, B, SUM(E);  -- cache contents: select A, B,
SUM(E) from VIEWX group by A, B                                  -- 230

-- cache filter spec
ALTER VIEW VIEWX ADD STATIC CACHE RETENTION 10 FILTER B > 10;  -- cache contents: select * from VIEWX
where B > 10;                                                    -- 240

-- cache grouping spec + filter spec
ALTER VIEW VIEWX ADD STATIC CACHE RETENTION 10 OF A, B, SUM(E) FILTER B > 10;  -- cache contents:
select A, B, SUM(E) from VIEWX where B > 10 group by A, B        -- 250
```

Figure 3
Prior Art

```
CREATE VIEW VIEWX as (SELECT A, B, C, D, E from TABX);          -- 310

-- target query q1
SELECT A, B, SUM(D) FROM VIEWX GROUP BY A, B;                    -- 320

-- target query q2
SELECT A, B, SUM(E) FROM VIEWX GROUP BY A, B;                    -- 325

-- option (A): create cache without cache spec
ALTER VIEW VIEWX ADD STATIC CACHE RETENTION 10;  -- cache contents: select * from VIEWX    -- 330

-- option (B): create cache with grouping spec
ALTER VIEW VIEWX ADD STATIC CACHE RETENTION 10 OF A, B, SUM(D), SUM(E);  -- cache contents: select A,
B, SUM(D), SUM(E) from VIEWX group by A, B                                                  -- 335
```

Figure 4
Prior Art

410 — CREATE VIEW VIEWX as (SELECT A, B, C, D, E from TABX);

420 — -- target query q3
425 — SELECT * FROM VIEWX WHERE B > 10;

-- target query q4
SELECT * FROM VIEWX WHERE B > 20;

430 — -- option (C): create cache without cache spec
ALTER VIEW VIEWX ADD STATIC CACHE RETENTION 10; -- cache contents: select * from VIEWX 435 — -- option (D): create cache with grouping spec
ALTER VIEW VIEWX ADD STATIC CACHE RETENTION 10 FILTER B > 10; -- cache contents: select * from VIEWX where B > 10

Figure 5
Prior Art

510 — CREATE VIEW VIEWX as (SELECT A, B, C, D, E, F, G, H, I, J, X, Y, Z from TABX);

-- VIEWX size: 100M

520 —
-- target query q5 / result size: 5K
SELECT A, B, SUM(X) FROM VIEWX GROUP BY A, B;
-- target query q6 / result size: 10K
SELECT A, B, C, SUM(Y) FROM VIEWX GROUP BY A, B, C;

525 —
-- target query q7 / result size: 0.5M
SELECT A, B, E, F, G, SUM(X) FROM VIEWX GROUP BY A, B, E, F, G;
-- target query q8 / result size: 1M
SELECT A, B, C, D, E, F, G, SUM(Y) FROM VIEWX GROUP BY A, B, C, D, E, F, G;

530 —
-- create a cache which can cover all target queries / cache size: 1M
ALTER VIEW VIEWX ADD STATIC CACHE RETENTION 10 OF A, B, C, D, E, F, G, SUM(X), SUM(Y);

Figure 6

510 — CREATE VIEW VIEWX as (SELECT A, B, C, D, E, F, G, H, I, J, X, Y, Z from TABX);

-- VIEWX size: 100M

520 —
-- target query q5 / result size: 5K
SELECT A, B, SUM(X) FROM VIEWX GROUP BY A, B;

-- target query q6 / result size: 10K
SELECT A, B, C, SUM(Y) FROM VIEWX GROUP BY A, B, C;

525 —
-- target query q7 / result size: 0.5M
SELECT A, B, E, F, G, SUM(X) FROM VIEWX GROUP BY A, B, E, F, G;

-- target query q8 / result size: 1M
SELECT A, B, C, D, E, F, G, SUM(Y) FROM VIEWX GROUP BY A, B, C, D, E, F, G;

610 —
-- cache spec CACHEX1: cache which can cover target query q5 and q6 / cache size: 10K
ALTER VIEW VIEWX ADD STATIC CACHE NAME CACHEX1 RETENTION 10 OF A, B, C, SUM(X), SUM(Y);

620 —
-- cache spec CACHEX2: cache which can cover target query q7 and q8 / cache size: 1M
ALTER VIEW VIEWX ADD STATIC CACHE NAME CACHEX2 RETENTION 10 OF A, B, C, D, E, F, G, SUM(X), SUM(Y);

-- (1) view (or function) DDLs

CREATE VIEW/FUNCTION WITH [<cache_type>] CACHE [NAME <cache_name>] <cache_spec> -- create cache with <cache_name>
ALTER VIEW/FUNCTION ADD [<cache_type>] CACHE [NAME <cache_name>] <cache_spec> -- create cache with <cache_name>
ALTER VIEW/FUNCTION ALTER [<cache_type>] CACHE [NAME <cache_name>] <alter_retention_clause>|<alter_location_clause>|...
-- alter cache <cache_name>
ALTER VIEW/FUNCTION DROP [<cache_type>] CACHE [NAME <cache_name>] | ALL -- drop cache <cache_name>, or drop all caches <cache_type> ::= STATIC | DYNAMIC <cache_name> ::= <identifier>
-- <cache_name> is optional
-- if <cache_name> is not specified, implicitly interpreted as auto-generated default cache name: _SYS_CACHE#<view_name>

<cache_spec> ::= [ RETENTION <minute_value> ]
    [ OF <projection_list> ]
    [ FILTER <filter_condition> ]
    [ <location_clause> ]
    [ FORCE ]

-- (2) system commands

ALTER SYSTEM CLEAR [<cache_type>] RESULT CACHE; -- same (drop all cache entry objects)
ALTER SYSTEM REMOVE [<cache_type>] RESULT CACHE ENTRY <id>; -- same (remove specified cache entry)
ALTER SYSTEM REFRESH [<cache_type>] RESULT CACHE ENTRY <id>; -- same (refresh specified cache entry)
ALTER SYSTEM REFRESH [<cache_type>] RESULT CACHE <view_name>; -- same (refresh all cache entries of the view)

Figure 8

810: CREATE VIEW VIEW_A AS (SELECT A, B, C, D, K FROM TAB_A);

820:
ALTER VIEW VIEW_A ADD STATIC CACHE NAME CACHE1 RETENTION 10 OF A, B, C, SUM(K);
ALTER VIEW VIEW_A ADD STATIC CACHE NAME CACHE2 RETENTION 10 OF A, C, SUM(K);
ALTER VIEW VIEW_A ADD STATIC CACHE NAME CACHE3 RETENTION 10;

830:
-- Target query q9
SELECT A, SUM(K) FROM VIEW_A GROUP BY A with hint (RESULT_CACHE); -- CACHE1, CACHE2, and CACHE3 can be utilized, so need to choose the target cache to be utilized.

Figure 9

910
ALTER VIEW VIEW_A ADD STATIC CACHE NAME CACHE4 RETENTION 10 OF A,B,C,SUM(K) FILTER A=3;
--DNF: (A=3)
ALTER VIEW VIEW_A ADD STATIC CACHE NAME CACHE5 RETENTION 10 OF A,B,C,SUM(K) FILTER A=3 and B=3;
--DNF: (A=3 and B=3)
ALTER VIEW VIEW_A ADD STATIC CACHE NAME CACHE6 RETENTION 10 OF A,B,C,SUM(K) FILTER A=3 and B=3 and C=3;
--DNF: (A=3 and B=3 and C=3)
ALTER VIEW VIEW_A ADD STATIC CACHE NAME CACHE7 RETENTION 10 OF A,B,C,SUM(K) FILTER A=3 or B=3;
--DNF: (A=3) or (B=3)
ALTER VIEW VIEW_A ADD STATIC CACHE NAME CACHE8 RETENTION 10 OF A,B,C,SUM(K) FILTER (A=3 and C=3) or (B=3);
--DNF: (A=3 and C=3) or (B=3)
ALTER VIEW VIEW_A ADD STATIC CACHE NAME CACHE9 RETENTION 10 OF A,B,C,SUM(K) FILTER (A=3) or (B=3 and C=3);
--DNF: (A=3) or (B=3 and C=3)
ALTER VIEW VIEW_A ADD STATIC CACHE NAME CACHE10 RETENTION 10 OF A,B,C,SUM(K) FILTER (A=3) and (B=3 or C=3);
--DNF: (A=3 and B=3) or (A=3 and C=3)
ALTER VIEW VIEW_A ADD STATIC CACHE NAME CACHE11 RETENTION 10 OF A,B,C,SUM(K) FILTER (A=3) and (B=3) and (C=2 or C=3);
--DNF: (A=3 and B=3 and C=2) or (A=3 and B=3 and C=3)
ALTER VIEW VIEW_A ADD STATIC CACHE NAME CACHE12 RETENTION 10 OF A,B,C,SUM(K) FILTER (A=1 and B=1 and C=1) or (A=2 and B=2 and C=2) or (A=3 and B=3 and C=3);
--DNF: (A=1 and B=1 and C=1) or (A=2 and B=2 and C=2) or (A=3 and B=3 and C=3)
ALTER VIEW VIEW_A ADD STATIC CACHE NAME CACHE13 RETENTION 10 OF A,B,C,SUM(K) FILTER A=? and B=?;
--DNF: (A=? and B=?)

920
-- Target query q10
SELECT A, SUM(K) FROM VIEW_A WHERE A=3 and B=3 and C=3 GROUP BY A with hint (RESULT_CACHE);

930
-- Target query q11
SELECT A, SUM(K) FROM VIEW_A WHERE A=? and B=? GROUP BY A with hint (RESULT_CACHE);

ALTER VIEW VIEW_A ADD STATIC CACHE NAME CACHE4 RETENTION 10 OF A,B,C,SUM(K) FILTER A=3;
--DNF: (A=3)
ALTER VIEW VIEW_A ADD STATIC CACHE NAME CACHE5 RETENTION 10 OF A,B,C,SUM(K) FILTER A=3 and B=3;
--DNF: (A=3 and B=3)
ALTER VIEW VIEW_A ADD STATIC CACHE NAME CACHE6 RETENTION 10 OF A,B,C,SUM(K) FILTER A=3 and B=3 and C=3;
--DNF: (A=3 and B=3 and C=3)
ALTER VIEW VIEW_A ADD STATIC CACHE NAME CACHE7 RETENTION 10 OF A,B,C,SUM(K) FILTER A=3 or B=3;
--DNF: (A=3) or (B=3)
ALTER VIEW VIEW_A ADD STATIC CACHE NAME CACHE8 RETENTION 10 OF A,B,C,SUM(K) FILTER (A=3 and C=3) or (B=3);
--DNF: (A=3 and C=3) or (B=3)
ALTER VIEW VIEW_A ADD STATIC CACHE NAME CACHE9 RETENTION 10 OF A,B,C,SUM(K) FILTER (A=3) or (B=3 or C=3);
--DNF: (A=3) or (B=3) or (C=3)
ALTER VIEW VIEW_A ADD STATIC CACHE NAME CACHE10 RETENTION 10 OF A,B,C,SUM(K) FILTER (A=3) and (B=3 or C=3);
--DNF: (A=3 and B=3) or (A=3 and C=3)
ALTER VIEW VIEW_A ADD STATIC CACHE NAME CACHE11 RETENTION 10 OF A,B,C,SUM(K) FILTER (A=3) and (B=3) and (C=2 or C=3);
--DNF: (A=3 and B=3 and C=2) or (A=3 and B=3 and C=3);
ALTER VIEW VIEW_A ADD STATIC CACHE NAME CACHE12 RETENTION 10 OF A,B,C,SUM(K) FILTER (A=1 and B=1 and C=1) or (A=2 and B=2 and C=2) or (A=3 and B=3 and C=3);
--DNF: (A=1 and B=1 and C=1) or (A=2 and B=2 and C=2) or (A=3 and B=3 and C=3)
ALTER VIEW VIEW_A ADD STATIC CACHE NAME CACHE13 RETENTION 10 OF A,B,C,SUM(K) FILTER A=? and B=?;
--DNF: (A=? and B=?)

1010

-- Target query q12
SELECT A, SUM(K) FROM VIEW_A WHERE A=3 and C=3 GROUP BY A with hint (RESULT_CACHE);

ALTER VIEW VIEW_A ADD STATIC CACHE NAME CACHE7 RETENTION 10 OF A,B,C,SUM(K) FILTER A=3 or B=3;
--DNF: (A=3) or (B=3)
ALTER VIEW VIEW_A ADD STATIC CACHE NAME CACHE8 RETENTION 10 OF A,B,C,SUM(K) FILTER (A=3 and C=3) or (B=3);
--DNF: (A=3 and C=3) or (B=3)
ALTER VIEW VIEW_A ADD STATIC CACHE NAME CACHE9 RETENTION 10 OF A,B,C,SUM(K) FILTER (A=3) or (B=3 and C=3);
--DNF: (A=3) or (B=3 and C=3)
ALTER VIEW VIEW_A ADD STATIC CACHE NAME CACHE10 RETENTION 10 OF A,B,C,SUM(K) FILTER (A=3) and (B=3 or C=3);
--DNF: (A=3 and B=3) or (A=3 and C=3)
ALTER VIEW VIEW_A ADD STATIC CACHE NAME CACHE11 RETENTION 10 OF A,B,C,SUM(K) FILTER (A=3) and (B=3) and (C=2 or C=3);
--DNF: (A=3 and B=3 and C=2) or (A=3 and B=3 and C=3)
ALTER VIEW VIEW_A ADD STATIC CACHE NAME CACHE12 RETENTION 10 OF A,B,C,SUM(K) FILTER (A=1 and B=1 and C=1) or (A=2 and B=2 and C=2) or (A=3 and B=3 and C=3);
--DNF: (A=1 and B=1 and C=1) or (A=2 and B=2 and C=2) or (A=3 and B=3 and C=3)

1120

-- Target query q13
SELECT A, SUM(K) FROM VIEW_A WHERE A=3 and B=3 and C=2 GROUP BY A with hint (RESULT_CACHE);

MANAGING MULTIPLE CACHE SPECIFICATIONS WITHIN A DATABASE ENVIRONMENT

BACKGROUND

Organizations increasingly need to manage large amounts of data in their database systems. Running queries on such database systems can use a significant amount of computing resources, including computer memory, storage, and processor resources. Therefore, it can be important to reuse query results when possible. One way of reusing query results is to cache the results to so they can be used later (e.g., when the same query is run again).

Caching query results from a particular view can save computing resources (e.g., processor resources) at the cost of increased memory consumption. When a subsequent query is received that operates on the particular view, the cached query results can be reused. Reusing cached query results can be efficient in some situations, but also suffers from some drawbacks. For example, the subsequent query may perform data manipulation operations (e.g., aggregation, filtering, etc.) that require additional processing be performed on the cached query results. Such additional processing can be resource intensive (e.g., in terms of memory, storage, and/or processor resources).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for managing multiple cache specifications for a single view in a database environment. For example, a plurality of caches can be crated for the single view. Each of the plurality of caches can have a different cache specification. A query can then be received that operates on the single view. One of the plurality of caches can be selected for processing the query. Determining which of the plurality of caches to select for processing the query involves analysis of the cache specifications. Once one of the caches is selected, the query can be processed using the selected cache. Results of processing the query can be output.

BRIEF DESCRIPTION OF THE DRAWINGS

FIG. 2 depicts example prior art statements for creating a view and various result caches for the view.

FIG. 3 depicts example prior art cache specification options, including a grouping specification.

FIG. 4 depicts example prior art cache specification options, including a filter specification.

FIG. 5 depicts example prior art cache specification options for example query patterns.

FIG. 6 depicts example multiple cache specifications for a single view.

FIG. 7 depicts an example syntax for managing multiple cache specifications.

FIG. 8 depicts examples of selecting between multiple cache specifications for the same view based upon grouping specifications.

FIG. 9 depicts examples of selecting between multiple cache specifications for the same view based upon filter specifications.

FIG. 10 depicts an example of selecting between multiple cache specifications for the same view based upon filter specifications.

FIG. 11 depicts an example of selecting between multiple cache specifications for the same view based upon filter specifications.

DETAILED DESCRIPTION

Overview

The following description is directed to technologies for managing multiple cache specifications for a single view in a database environment. For example, a plurality of caches can be created for the single view. Each of the plurality of caches can have a different cache specification (e.g., different grouping specifications and/or different filter specifications). A query can then be received that operates on the single view. One of the plurality of caches can be selected for processing the query. Determining which of the plurality of caches to select for processing the query involves analysis of the cache specifications. Once one of the caches is selected, the query is processed using the selected cache. Results of processing the query can be output.

Figure 1:
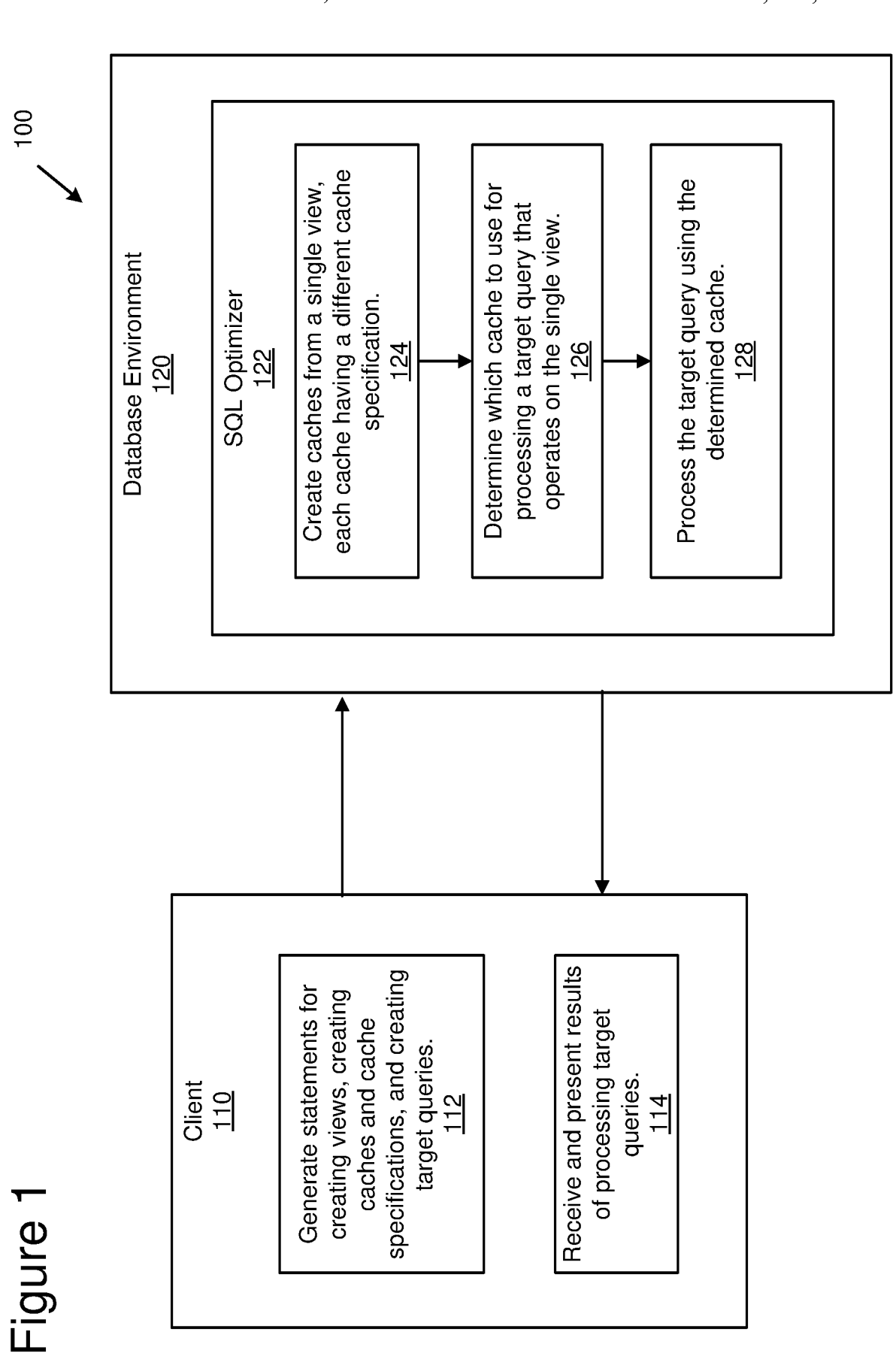
FIG. 1 is a diagram depicting an example environment for managing multiple cache specifications for a single view.

FIG. 1 is a diagram depicting an example environment 100 for managing multiple cache specifications for a single view. The example environment 100 depicts a client 110. The client 110 can be any type of computing hardware and/or software that is configured (e.g., running computer-executable instructions) to perform operations implementing the technologies described herein. The client 110 can run on various types of computing resources (e.g., a server computer, desktop computer, laptop computer, smart phone, virtual computer, or another type of computing device).

The example environment 100 depicts a database environment 120. The database environment 120 can be any type of environment that provides database services. In some implementations, the database environment 120 comprises the SAP HANA® in-memory database. The database environment 120 operates using computing hardware and/or software that is configured (e.g., running computer-executable instructions) to perform operations implementing the technologies described herein.

The database environment 120 includes a SQL optimizer 122 that performs various query processing operations. In this implementation, the SQL optimizer 122 performs the operations depicted at 124-128. Specifically, at 124, a plurality of caches are created from a single view. Each of the plurality of caches has a different cache specification. The different cache specifications can include different grouping specifications, different filter specifications, and/or other different types of cache specifications. At 126, one of the plurality of caches is determined to use for processing a target query that operates on the single view. Determining which of the plurality of caches to select involves evaluating their associated cache specifications. In some implementations, a matching heuristic is applied to select which cache to use. At 128, the target query is processed using the determined cache with its associated cache specification.

The client 110 supports operations for interacting with the database environment 120. For example, the client can provide a user interface (e.g., a graphical user interface) allowing a user to enter queries and view results. As depicted at 112, the client supports generating statements for creating views (e.g., using a "CREATE VIEW" statement, examples of which will be discussed below), for creating caches (e.g., using an "ALTER VIEW" statement, examples of which will be discussed below), and for creating target queries (e.g., using a "SELECT" statement, examples of which will be discussed below). The client 112 can generate these statements by accessing the database environment 120 (e.g., via a database application hosted by the database environment 120 using software, such as a web browser, running at the client 110). As depicted at 114, the client can receive results from the database environment 120 from processing the target queries and present the results at the client 110 (e.g., via a computer user interface).

Cached Views and Cache Specifications

In the technologies described herein, query results associated with views can be cached. As used herein, a "view" is a virtual database table. A view is created by retrieving database data in response to a query. The retrieved database data can come from one database table or from multiple database tables. For example, a view can be created that contains data (e.g., a subset of data) from a single table or that combines data from multiple database tables (e.g., using a join operation).

In current database systems, such as the SAP HANA in-memory database, query results, in the form of views, can be cached. Caching is performed so that queried database data can be reused without having to retrieve and process the database data every time it is requested.

Frequently accessed views may consume an excessive amount of CPU resources. By caching the accessed views, the CPU consumption can be traded for an increase in memory consumption. For example, query results can be cached as a view (e.g., in a result cache) and the cached results can be reused when the view is accessed by a subsequent query. This type of cache is also referred to as a static cache or a static result cache. The query result of a view that is cached can be refreshed periodically. This allows the view to provide updated results when it is accessed by a subsequent query. However, the cached data could become stale if the tables used by the view are updated after the last refresh. In some implementations, there are parameters that control the data retention period.

FIG. 2 depicts example prior art statements for creating a view and various result caches for the view. As depicted at 210, the first SQL statement is a create statement that creates the view named "VIEWX." The definition of the view is a simple select statement that selects columns A, B, C, D, and E from the table named "TABX."

At 220, a cache statement is depicted. This cache statement creates a cache of the results of the view named VIEWX (also referred to as a cached view). This cache statement does not contain a cache specification (e.g., there is no grouping or filtering specified). This is also depicted by the comment "-- no cache spec." Therefore, the cache created by this cache statement will contain all results from the VIEWX view (i.e., columns A, B, C, D, and E from TABX). This cache statement also contains a retention parameter "RETENTION 10," which specifies that this cache will be refreshed every 10 minutes. Throughout the various statements depicted in this Figure and in other Figures, comments are preceded by two dashes (e.g., "-- no cache spec").

At 230, another cache statement is depicted. This cache statement creates a cache of aggregated results of the view VIEWX. Specifically, the "OF A, B, SUM(E)" portion of the statement means that this cache will select A, B, and SUM(E) from the VIEWX view, but then group the results by A, B (i.e., a SQL "group by" statement). This type of cache statement is called a cache grouping specification.

At 240, another cache statement is depicted. This cache statement creates a cache of a subset of the results of the view VIEWX. Specifically, this statement depicts a cache filter specification in which the cache results from the VIEWX view are filtered by the "FILTER B >10" portion of the statement (which is equivalent to: select * from VIEWX where B>10). This type of cache statement is called a cache filter specification.

At 250, another cache statement is depicted. This cache statement creates a cache of a subset of aggregated results by combining a cache grouping specification and a cache filter specification. This result data retained by this cache statement corresponds to: select A, B, SUM(E) from VIEWX where B>10 group by A, B.

FIG. 3 depicts example prior art cache specification options for example queries, including a grouping specification. These examples illustrate why cache specifications are useful. As depicted at 310, a first SQL statement is a create statement that creates the view named "VIEWX." The definition of the view is a simple select statement that selects columns A, B, C, D, and E from the table named "TABX."

At 320, target query q1 is depicted. Target query q1 selects specific data from the VIEWX view (defined at 310) and includes a group by operator. At 325, target query q2 is depicted. Target query q2 selects different data from the VIEWX view and also includes a group by operator.

At 330, a first cache statement is depicted, named option A, that creates a cache of the results of the VIEWX view without any cache specification. The option A cache supports target query q1 and target query q2. Because the option A cache does not have any cache specification (e.g., no grouping or filtering specification), the option A cache contains all of the rows of the VIEWX view. For example, if the VIEWX view contains 100 million records, then the option A cache would contain 100 million records. Therefore, the option A cache can be inefficient in terms of memory consumption if the target queries that use the option A cache do not need to access all records of the VIEWX view.

Taking into account target queries q1 and q2, a more efficient cache can be created. At 335, a second cache statement is depicted, named option B, that creates a cache of the results of the VIEWX view using a cache specification. Specifically, the option B cache only selects the columns needed for the target queries and contains a grouping specification. Like the option A cache, the option B cache supports target query q1 and target query q2, but uses less memory. For example, if the VIEWX view contains one hundred million records, then the option A cache would contain one hundred million records, but the option B cache would contain fewer records (e.g., one hundred thousand records). Therefore, the option B cache can be much more efficient (e.g., in terms of computer memory utilization) than the option A cache while still supporting both target queries q1 and q2.

FIG. 4 depicts example prior art cache specification options for example queries, including a filter specification. These examples illustrate why cache specifications are useful. As depicted at 410, a first SQL statement is a create statement that creates the view named "VIEWX." The definition of the view is a simple select statement that selects columns A, B, C, D, and E from the table named "TABX."

At 420, target query q3 depicted. Target query q3 selects all columns from the VIEWX view (defined at 410) and includes a filter condition (B>10). At 425, target query q4 is depicted. Target query q4 also selects all columns from the VIEWX view and includes a different filter condition (B>20).

At 430, a first cache statement is depicted, named option C, that creates a cache of the results of the VIEWX view without any cache specification. The option C cache supports target query q3 and target query q4. Because the option C cache does not have any cache specification (e.g., no grouping or filtering specification), the option C cache contains all of the rows of the VIEWX view. For example, if the VIEWX view contains 100 million records, then the option C cache would contain 100 million records. Therefore, the option C cache can be inefficient in terms of memory consumption if the target queries that use the option C cache do not need to access all records of the VIEWX view.

Taking into account target queries q3 and q4, a more efficient cache can be created. At 435, a second cache statement is depicted, named option D, that creates a cache of the results of the VIEWX view using a cache specification. Specifically, the option D cache only retains data that is needed to satisfy target queries q3 and q4 using a filter specification (in this example, FILTER B>10). Like the option C cache, the option D cache supports target query q3 and target query q4, but uses less memory. For example, if the VIEWX view contains one hundred million records, then the option C cache would contain one hundred million records, but the option D cache would contain fewer records (due to the filtering which retains only rows where B>10). Therefore, the option D cache can be much more efficient (e.g., in terms of computer memory utilization) than the option C cache while still supporting both target queries q3 and q4.

FIG. 5 depicts example prior art cache specification options for example query patterns. As depicted at 510, a first SQL statement is a create statement that creates the view named "VIEWX." The definition of the view is a simple select statement that selects columns A, B, C, D, E, F, G, H, I, J, X, Y, Z from the table named "TABX." In this example, the size of the VIEWX view is 100 million records.

At 520, target queries q5 and q6 are depicted. These two queries are grouped together because they return relatively fewer rows (in this example, the result size of q5 is 5,000 records and the result size of q6 is 10,000 records). For example, these two queries can represent a coarse level of granularity (e.g., grouping based on a year or country).

At 525, target queries q7 and q8 are depicted. These two queries are grouped together because they return a relatively larger number of rows (in this example, the result size of q7 is a half million records and the result size of q8 is one million records). For example, these two queries can represent a fine level of granularity (e.g., grouping based on month or city).

In some implementations, the database environment tracks queries to determine the most common queries, which can be called query patterns. For example, the most common queries that access a particular view can be identified as a query pattern for the particular view. In this example scenario, target queries q5, q6, q7, and q8 can represent common query patterns (e.g., the top four queries operating on the VIEWX view).

Taking into account target queries q5, q6, q7, and q8, a cache can be created. At 530, a cache statement is depicted that creates a cache of the results of the VIEWX view using a cache specification. In order to satisfy queries q5, q6, q7, and q8, the cache statement needs to include all of the groupings needed by the queries. As a result, the cache is quite large (in this example, it contains one million records).

In the described prior art solutions (e.g., as depicted in FIG. 5), only one cache specification can be defined per view. Therefore, to cover target queries q5, q6, q7, and q8, the single cache needs to include all data that is needed for these queries. The cache statement depicted at 530 creates a cache of the results of the VIEWX view that satisfies the requirement of covering target queries q5, q6, q7, and q8. However, in order to satisfy queries q5, q6, q7, and q8, the cache statement needs to include all of the groupings needed by the queries. As a result, the cache is quite large (in this example, it contains one million records). Processing queries such as q7 and q8 can be performed relatively efficiently using this cache, but processing queries such as q5 and q6 using this cache will result in poor performance as additional post-grouping operations will be needed.

Multiple Cache Specifications

In the technologies described herein, multiple result caches can be created for the same view, with each cache having a different cache specification. Supporting multiple cache specifications for the same view provides advantages. For example, multiple cache specifications can be more efficient in terms of memory utilization. For example, instead of having one large cache that covers all target queries, each of multiple caches can be tailored to a specific query or to a specific set of queries. The multiple caches can each use less memory than a single large cache. In addition, processing resources can be saved by using multiple cache specifications. For example, instead of having one large cache that requires re-processing for certain target queries, each of the multiple caches can be tailored to support specific target queries so that additional processing of the cache results is reduced or eliminated.

FIG. 6 depicts example multiple cache specifications for a single view. FIG. 6 depicts the same view (depicted at 510) and the same sets of target queries (depicted at 520 and 525) as in FIG. 5.

Depicted at 610 is a cache statement that creates a cache (named CACHEX1 using the NAME parameter of the cache statement) of the results of the VIEWX view using a first cache specification. CACHEX1 is tailored to cover target queries q5 and q6. As a result, CACHEX1 is efficient in terms of memory utilization (in this example, the cache size of CACHEX1 is 10,000 records) and in terms of processing resources (e.g., target queries q5 and q6 can be processed without requiring substantial additional aggregation).

Depicted at 620 is a cache statement that creates a cache (named CACHEX2 using the NAME parameter of the cache statement) of the results of the VIEWX view using a second cache specification. CACHEX2 is tailored to cover target queries q7 and q8. As a result, CACHEX2 is efficient in terms of memory utilization (in this example, the cache size of CACHEX2 is one million records, which is significantly smaller than the one hundred million record size of VIEWX) and in terms of processing resources (e.g., target queries q7 and q8 can be processed without requiring substantial additional aggregation).

As illustrated by CACHEX1 and CACHEX2, multiple caches can be created for the same view (in the example, VIEWX), with each cache having a different cache specification. In general, any number of caches can be created, each having their own unique cache specification. However, as a practical matter, there is a tradeoff to be considered when determining how many caches to be created. The tradeoff is one of memory consumption versus performance. Creating more caches will use more memory and/or storage resources, but provide improved performance (e.g., reduced processing resources).

In some implementations, cache specifications are created based on characteristics of sets of target queries. Target queries can be grouped based on various characteristics, such as the columns they select, the functions they perform (e.g., aggregate functions), group by statements, level of granularity, result size (e.g., number of records), and/or other characteristics. Target queries that have similar characteristics can be grouped together and a different cache specification can be created for each group.

FIG. 7 depicts an example syntax 700 for managing multiple cache specifications in a specific implementation. The example syntax 700 is defined in data definition language (DDL) format. Other implementations can define multiple cache specification in other ways or using a different syntax. In some implementations, an explicitly supplied cache name is optional (e.g., a unique name can be generated automatically if it is not supplied in the cache statement).

Determining Which Multiple Cache Specification to Use

In the technologies described herein, selecting between multiple caches (each having a different cache specification) for the same, single, view can be performed based on various criteria. In some implementations, determining which cache to use for a given query involves determining which cache (among a plurality of available caches, each having a different cache specification) will minimize the amount of post processing needed for the target query (e.g., the amount of grouping and/or filtering that would be needed to process the target query). In some implementations the determination of which cache to use is performed by the query optimizer.

For example, using the queries and caches depicted in FIG. 6, if query q5 is received by a query optimizer, the query optimizer can decide whether to use CACHEX1 or CACHEX2 to process the query. Both CACHEX1 and CACHEX2 could be used to process the query as both contain the needed results. However, it is often the case that the query can be more efficiently processed using one cache (with a first cache specification) rather than another cache (with a second cache specification). In this situation, q5 would be more efficiently processed using CACHEX1 (rather than CACHEX2), so the query optimizer should select CACHEX1 to process query q5.

In some implementations, the decision of which cache (and associated cache specification) to choose is based on a matching heuristic. The heuristic is used to match a target query (e.g., an incoming SQL query for processing) to the best cache (e.g., the cache that would allow for efficient processing of the query). In some implementations, the heuristic performs a number of evaluation steps in order until a satisfactory result is found, as described below.

According to a prerequisite step, the available caches for the given view are checked to determine which of them could be used to process the target query (i.e., which could cover the query). In some situations, some caches may not have the columns and/or records needed to process the target query. Those caches that could not be used to process the target query are removed from consideration (i.e., they are not evaluated by the matching heuristic), and only those caches that could be used to process the target query proceed to be evaluated by the matching heuristic.

According to a first heuristic step, caches with grouping specifications that can cover the target query are preferred over caches with no grouping specification. This step operates to remove caches from consideration that do not have a grouping specification and would therefore require additional processing for a query that has a group by statement. If this step results in only one possible matching cache, then it is selected as the cache to use. However, if this step results in two (or more) possible matching caches, then the heuristic evaluation proceeds to the next step.

According to a second heuristic step, the possible caches from the first step are further evaluated. In this step, the cache with the fewest columns in its grouping specification, while still satisfying the target query, is selected as the cache to use. If this step results in only one possible matching cache, then it is selected as the cache to use. However, if this determination results in two (or more) possible matching caches that have the same fewest number of columns, then the heuristic evaluation proceeds to the third step.

According to a third heuristic step, the possible caches from the second step are further evaluated. In this step, filter specifications are examined. This step includes four sub-steps. In a first sub-step, if there is one cache with the same filter specification as the target query, then it is selected. In a second sub-step, if there is one cache that does not need a runtime parameter check, then it is selected. In a third sub-step, the remaining candidate caches are converted disjunctive normal form (DNF) and the cache with the fewest number of DNF terms is selected. If there are multiple caches with the fewest number of DNF terms, then evaluation proceeds to the next sub-step. In a fourth sub-step, the cache with the largest number of inner DNF terms is preferred. If the fourth sub-step results in one cache, then it is selected. Otherwise, the remaining candidate caches are evaluated in the fourth step.

In some implementations, the third heuristic step begins by performing a filter subsumption test as an initial operation to identify candidate caches. With the filter subsumption test, a cache with a smaller result size is retained as a candidate cache if it is subsumed within a cache with a larger result size (which is not retained).

According to a fourth heuristic step, the possible caches from the third step are further evaluated. In this step, an arbitrary cache is selected from the remaining candidate caches (e.g., randomly).

In some implementations, the matching heuristic can be summarized using the following numbered steps.
1. Prefer cache with grouping specification
2. Prefer the grouping specification with fewer grouping columns
3. Filter specification matching with DNF
   3-1. Prefer exact filter specification matching
   3-2. Prefer cache does not need a runtime parameter check
   3-3. Prefer fewer number of DNF terms
   3-4. Prefer larger number of Inner DNF terms 4. If multiple caches remaining, pick arbitrary one FIG. 8 depicts examples of selecting between multiple cache specifications for the same view. This example illustrates how the first and second heuristic steps (dealing with grouping specifications) can be applied to select which cache to use. Depicted at 810 is a view statement that creates the view VIEW_A. Depicted at 820 are three cache statements that create three corresponding caches based on the view VIEW_A. At 830, target query q9 is depicted. Target query q9 selects certain data from view VIEW_A and contains a group by statement. Target query q9 also contains a "RESULT_CACHE" hint, which in some implementations means that target query q9 will use a matching cache, if available, to process the query.

To determine which cache to use to process target query q9, a matching heuristic is applied. According to the heuristic steps discussed above, a prerequisite step is performed to determine which caches could be used to process target query q9. In this example, any of the three caches (CACHE1, CACHE2, or CACHE3) could be used to process target query q9 because they all have the needed data. Therefore, the prerequisite step identifies CACHE1, CACHE2, and CACHE3 as available caches.

Next, the first heuristic step is applied, which prefers caches with grouping specifications. In this example, CACHE1 and CACHE2 would be preferred over CACHE3 because CACHE1 and CACHE2 have a grouping specification (that can cover target query q9) while CACHE3 does not. Because CACHE1 and CACHE2 have a grouping specification, their size would be smaller than CACHE3. Because there are still two caches to choose between, the heuristic evaluation proceeds to the next step.

Next, the second heuristic step is applied, which prefers the cache with the fewest columns in its grouping specification. In this example, CACHE2 is preferred over CACHE1 because CACHE2 has fewer columns in its grouping specification while still satisfying target query q9, and as a result the cache size of CACHE2 is smaller than the cache size of CACHET. Because there is only one cache, CACHE2, remaining at the end of this step, CACHE2 is selected as the cache that will be used for processing target query q9. And, in this example, the remaining heuristic steps do not need to be considered.

FIG. 9 depicts examples of selecting between multiple cache specifications for the same view. This example illustrates how the third heuristic step, and its sub-steps, (dealing with filter specifications) can be applied to select which cache to use.

Depicted at 910 are a number of cache statements (CACHE4 through CACHE13) based on the view VIEW_A (depicted at 810). These cache statements all contain a different filter specification. At 920, target query q10 is depicted. Target query q10 selects certain data from view VIEW_A and contains a filter statement ("WHERE A=3 and B=3 and C=3"). According to the third heuristic step, caches CACHE4 through CACHE13 are evaluated (all of these caches could cover target query q10, and all would be selected according to the filter subsumption test). Based on the first sub-step of the third heuristic step, there is only one cache, CACHE6, with the same filter specification as target query q10. Therefore, in this example, CACHE6 is selected as the cache to use when processing target query q10.

At 930, target query q11 is depicted. Target query q11 selects certain data from view VIEW_A and contains a filter statement ("WHERE A=? and B=?", where A and B are provided as input parameters). According to the third heuristic step, caches CACHE4 through CACHE13 are evaluated (alternatively, using the filter subsumption test, only CACHE4, CACHE5, CACHE7-CACHE10, and CACHE13 would be evaluated). Based on evaluation of the first sub-step of the third heuristic step, two caches are identified, CACHE5 and CACHE13 (both could be exact matches for the filter specification). Moving on to the second sub-step of the third heuristic step, CACHE13 is selected because it does not need a runtime parameter check (i.e., if CACHE5 was selected, then at query execution time parameters for A and B would need to be checked, and if they are not both 3, then CACHE5 could not be used).

FIG. 10 depicts an example of selecting between multiple cache specifications for the same view. Specifically, FIG. 10 continues the example scenario depicted in FIG. 9 by evaluating an additional target query using the same available caches (depicted at 910).

At 1010, target query q12 is depicted. Target query q12 selects certain data from view VIEW_A and contains a filter statement ("WHERE A=3 and C=3"). According to the third heuristic step, caches CACHE4 through CACHE13 are evaluated (alternatively, using the filter subsumption test, only CACHE4, CACHE7, CACHE8, CACHE9, and CACHE10 would be evaluated). Based on the first sub-step of the third heuristic step, there is no cache with the exact filter specification, so all candidates proceed to the next sub-step. Based on the second sub-step of the third heuristic step, none of the candidate caches require a runtime parameter check. Based on the third sub-step of the third heuristic step, the cache with the fewest number of DNF terms is preferred. In this example, CACHE4 is selected because it only has one DNF term (where the other candidate caches have two or more DNF terms).

FIG. 11 depicts an example of selecting between multiple cache specifications for the same view. Specifically, FIG. 11 continues the example scenario depicted in FIG. 9 by evaluating an additional target query using some of the available caches that were depicted at 910. Specifically, in this example scenario, only CACHE7 through CACHE12 are available, as depicted at 1110.

At 1120, target query q13 is depicted. Target query q13 selects certain data from view VIEW_A and contains a filter statement ("WHERE A=3 and B=3 and C=2"). From the available caches, CACHE7 through CACHE11 are considered after the filter subsumption test. Based on the first sub-step of the third heuristic step, there is no cache with the exact filter specification, so all candidates proceed to the next sub-step. Based on the second sub-step of the third heuristic step, none of the candidate caches require a runtime parameter check. Based on the third sub-step of the third heuristic step, all candidate caches have two DNF terms. Based on the fourth sub-step of the third heuristic step, CACHE11 is selected as it has the largest total number of inner terms (CACHE11 has six inner terms), which is more than the other candidate caches CACHE7 through CACHE10.

Methods for Managing Multiple Cache Specifications for a Single View

In the technologies described herein, multiple caches that reference a single view can be managed. For example, each of the multiple caches can be created, where each cache has a different cache specification. Target queries can be received and processed where the target queries reference the single view. When processing a given targe query, one of the multiple caches can be selected based on various criteria, such as by using a matching heuristic.

Figure 12:
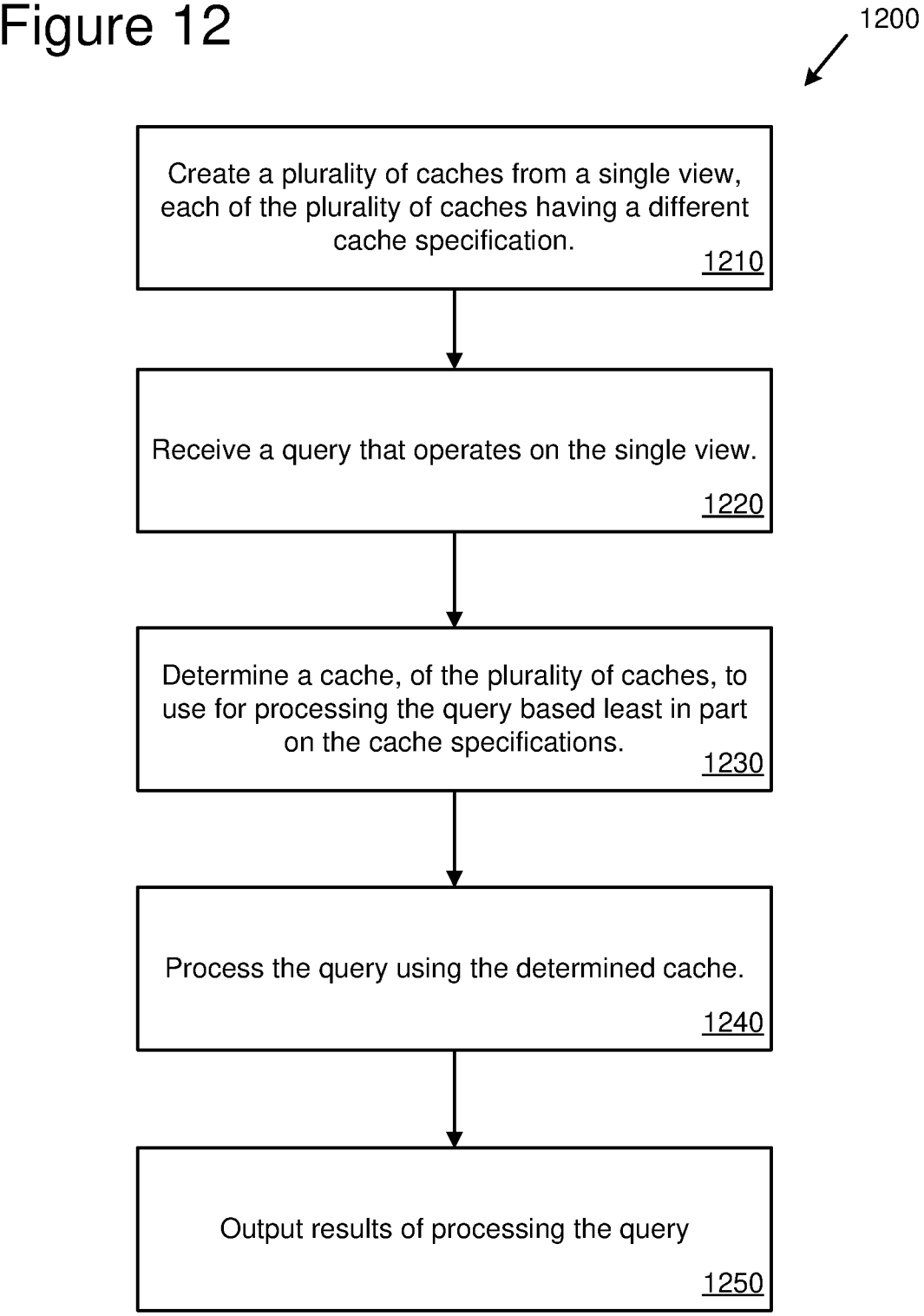
FIG. 12 is a is a flowchart of an example method for managing multiple cache specifications for a single view in a database environment.

FIG. 12 is a flowchart of an example method 1200 for managing multiple cache specifications for a single view in a database environment. At 1210, a plurality of caches is created from a single view. Each of the plurality of caches has a different cache specification. For example, a first cache could be created with a first grouping specification, a second cache could be created with a second grouping specification, a third cache could be created with a first filter specification, and so on.

At 1220, a query is received that operates on the single view. For example, the query can comprise a SQL select statement that selects at least a portion of database data from the single view.

At 1230, a cache is determined, from the plurality of caches, to use for processing the query. The determination is made based at least in part on the cache specifications of the plurality of caches. In some implementations, one or more heuristic steps are performed to determine the cache to use.

At 1240, the query is processed using the determined cache.

At 1250, results of processing the query using the determined cache are output. For example, the results can be returned to a user (e.g., to a client application, such as a web browser client, operated by the user), saved to a file, or output in another way.

Figure 13:
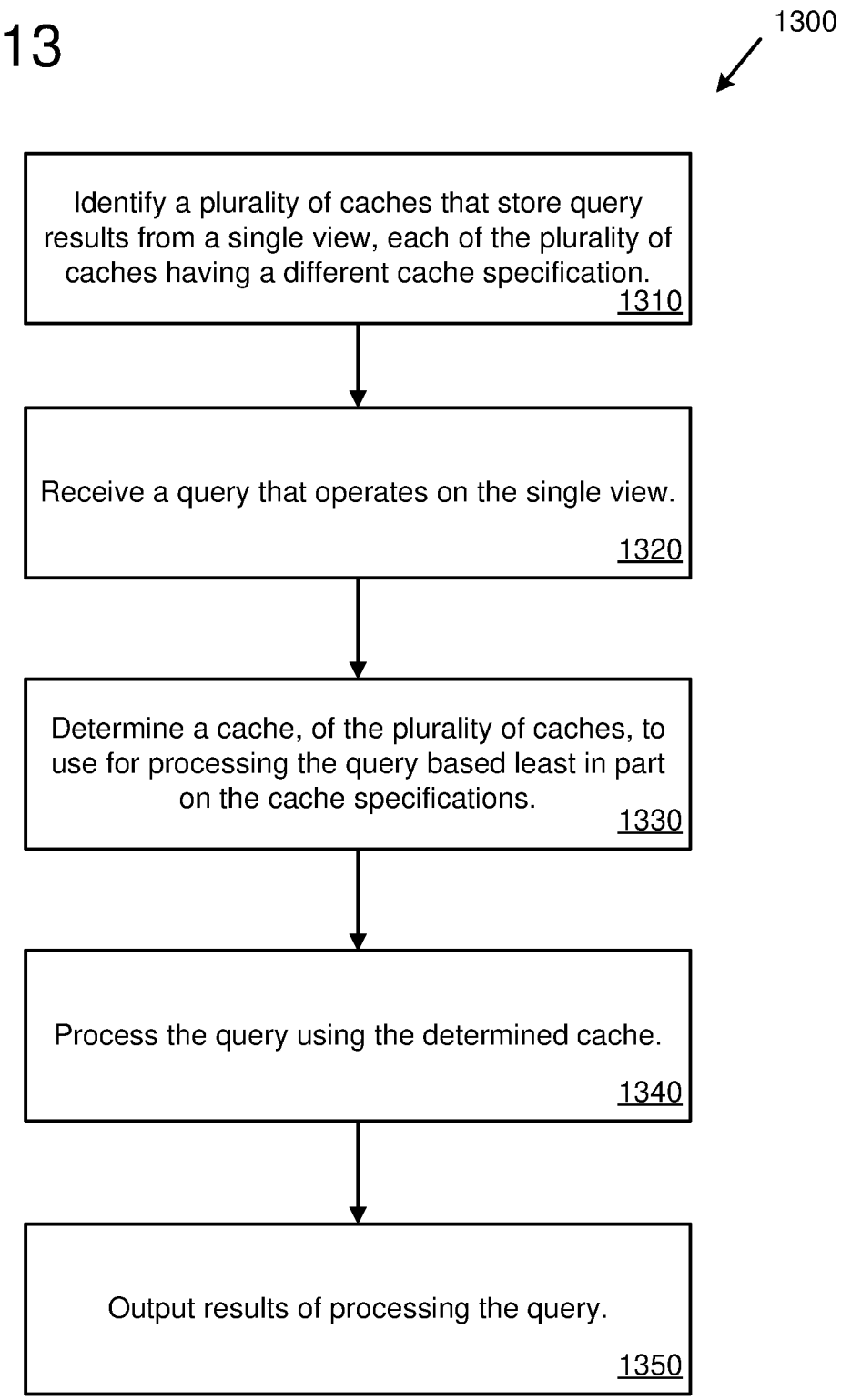
FIG. 13 is a is a flowchart of an example method for managing multiple cache specifications for a single view in a database environment.

FIG. 13 is a flowchart of an example method 1300 for managing multiple cache specifications for a single view in a database environment. At 1310, a plurality of caches are identified. The plurality of caches store query results from a single view. In addition, each of the plurality of caches has a different cache specification. For example, a first cache could be created with a first grouping specification, a second cache could be created with a second grouping specification, a third cache could be created with a first filter specification, and so on.

At 1320, a query is received that operates on the single view. For example, the query can comprise a SQL select statement that selects at least a portion of database data from the single view.

At 1330, a cache is determined, from the plurality of caches, to use for processing the query. The determination is made based at least in part on the cache specifications of the plurality of caches. In some implementations, one or more heuristic steps are performed to determine the cache to use.

At 1340, the query is processed using the determined cache.

At 1350, results of processing the query using the determined cache are output. For example, the results can be returned to a user (e.g., to a client application, such as a web browser client, operated by the use), saved to a file, or output in another way.

Computing Systems

Figure 14:
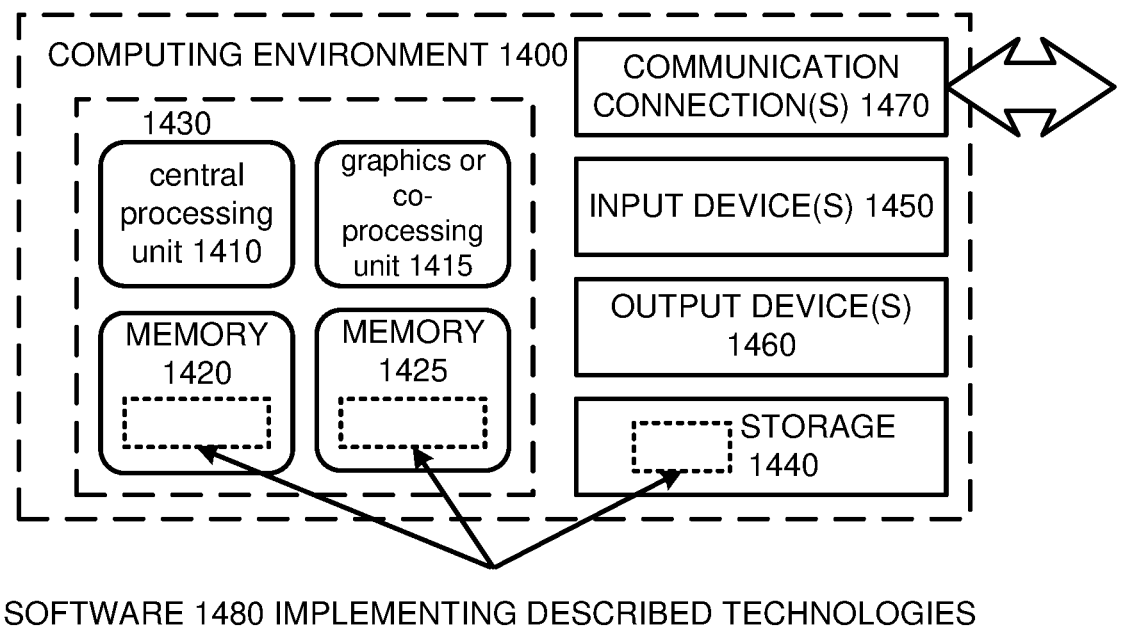
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s). The memory 1420, 1425 stores software 1480 implementing one or more innovations described herein, in the form of computer-executable instructions suitable for execution by the processing unit(s).

A computing system may have additional features. For example, the computing system 1400 includes storage 1440, one or more input devices 1450, one or more output devices 1460, and one or more communication connections 1470. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. For video encoding, the input device(s) 1450 may be a camera, video card, TV tuner card, or similar device that accepts video input in analog or digital form, or a CD-ROM or CD-RW that reads video samples into the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 15:
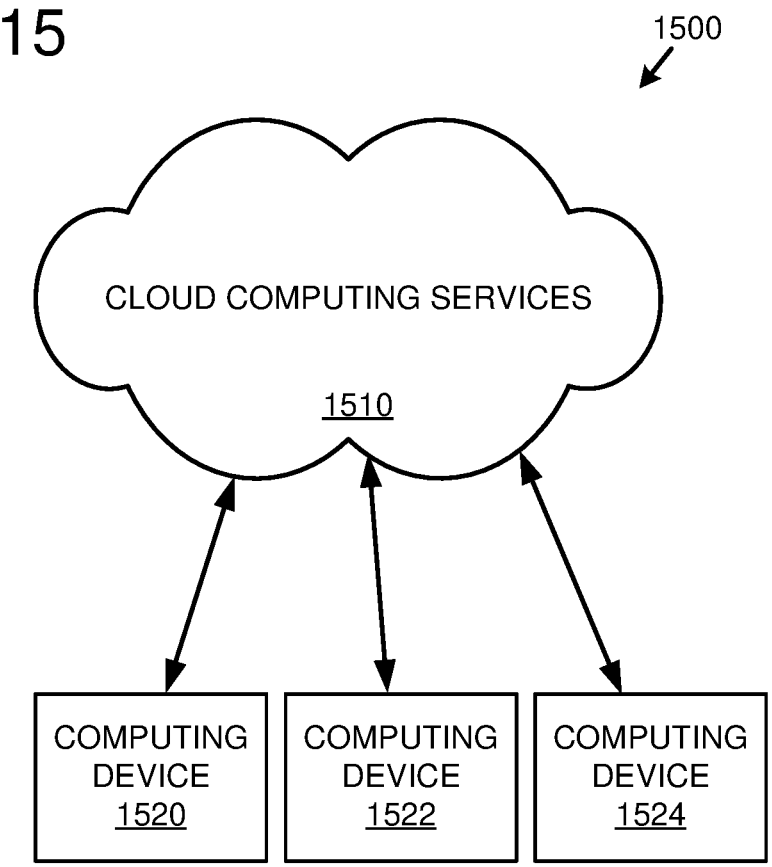
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, database resources, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections, such as 1470.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for managing multiple cache specifications for a single view in a database environment, the method comprising:

creating a plurality of caches within the database environment from the single view, wherein each of the plurality of caches has a different cache specification, comprising:
    creating a first cache within the database environment, wherein the first cache stores results from the single view, and wherein the first cache has a first cache specification; and
    creating a second cache within the database environment, wherein the second cache stores results from the single view, and wherein the second cache has a second cache specification different from the first cache specification;
receiving a query that operates on the single view;
determining a cache, of the plurality of caches, to use for processing the query based at least in part of the cache specifications of the plurality of caches;
processing the query using the determined cache; and
outputting results of processing the query.

2. The method of claim 1, wherein the first and second cache specifications support at least a grouping specification and a filter specification.

3. The method of claim 1, wherein the first cache specification comprises a grouping specification, and wherein the second cache specification comprises a filter specification.

4. The method of claim 1, wherein the single view is generated based at least in part on a SQL select statement that selects at least a portion of database data from one or more database tables within the database environment.

5. The method of claim 1, wherein the query comprises a SQL select statement that selects at least a portion of database data from the single view.

6. The method of claim 1, wherein determining a cache, of the plurality of caches, to use for processing the query based at least in part of the cache specifications of the plurality of caches comprises:
    preferring a cache that has a grouping specification over a cache that does not have a grouping specification.

7. The method of claim 1, wherein determining a cache, of the plurality of caches, to use for processing the query based at least in part of the cache specifications of the plurality of caches comprises:
    preferring a cache with fewest number of columns in its grouping specification.

8. The method of claim 1, wherein determining a cache, of the plurality of caches, to use for processing the query based at least in part of the cache specifications of the plurality of caches comprises:
    preferring a cache with a same filter specification as the query.

9. The method of claim 1, wherein determining a cache, of the plurality of caches, to use for processing the query based at least in part of the cache specifications of the plurality of caches comprises:
    preferring a cache with a fewest number of disjunctive normal form (DNF) terms.

10. The method of claim 1, wherein determining a cache, of the plurality of caches, to use for processing the query comprises performing at least the following heuristic steps in order until a single cache is determined:
    selecting those caches, of the plurality of caches, that could cover the query as candidate caches;
    preferring candidate caches that have a grouping specification over candidate caches that do not have a grouping specification; and
    preferring candidate caches with a fewest number of columns in its respective grouping specification.

11. The method of claim 10, wherein the heuristic steps further comprise, in order:
    preferring candidate caches with a same filter specification;
    preferring candidate caches that do not need a runtime parameter check;
    preferring candidate caches with a fewest number of disjunctive normal form (DNF) terms; and
    preferring candidate caches with a largest number of inner DNF terms.

12. The method of claim 1, wherein the method is performed, at least in part, by a SQL optimizer.

13. One or more computing devices comprising:
one or more processors; and
memory;
    the one or more computing devices configured, via computer-executable instructions, to perform operations for managing multiple cache specifications for a single view in a database environment, the operations comprising:
        identifying a plurality of caches within the database environment, wherein each of the plurality of caches stores query results from the single view, and wherein each of the plurality of caches has a different cache specification;
        receiving a query that operates on the single view, wherein the query comprises a SQL select statement that selects at least a portion of database data from the single view;
        determining a cache, of the plurality of caches, to use for processing the query based at least in part of the cache specifications of the plurality of caches;
        processing the query using the determined cache; and
        outputting results of processing the query.

14. The one or more computing devices of claim 13, wherein at least a first cache, of the plurality of caches, comprises a grouping specification, and wherein at least a second cache, of the plurality of caches, comprises a filter specification.

15. The one or more computing devices of claim 13, wherein determining a cache, of the plurality of caches, to use for processing the query is performed at least in part by analyzing cache grouping specifications, comprising:
    if there is only one cache, of the plurality of caches, that has a grouping specification that covers the query, then determining that cache to use for processing the query; and
    otherwise if there is only one cache, of the plurality of caches, that has a fewest number of columns in its grouping specification that covers the query, then determining that cache to use for processing the query.

16. The one or more computing devices of claim 13, wherein determining a cache, of the plurality of caches, to use for processing the query comprises performing at least the following heuristic steps in order until a single cache is determined:
    selecting those caches, of the plurality of caches, that could cover the query as candidate caches;
    preferring candidate caches that have a grouping specification over candidate caches that do not have a grouping specification; and
    preferring candidate caches with a fewest number of columns in its respective grouping specification.

17. The one or more computing devices of claim 16, wherein the heuristic steps further comprise, in order:
    preferring candidate caches with a same filter specification;

preferring candidate caches that do not need a runtime parameter check;

preferring candidate caches with a fewest number of disjunctive normal form (DNF) terms; and preferring candidate caches with a largest number of inner DNF terms.

18. One or more non-transitory computer-readable storage media storing computer-executable instructions for execution on one or more computing devices to perform operations for managing multiple cache specifications for a single view in a database environment, the operations comprising:

identifying a plurality of caches within the database environment, wherein each of the plurality of caches stores query results from the single view, and wherein each of the plurality of caches has a different cache specification;

receiving a query that operates on the single view, wherein the query comprises a SQL select statement that selects at least a portion of database data from the single view;

determining a cache, of the plurality of caches, to use for processing the query based at least in part of the cache specifications of the plurality of caches;

processing the query using the determined cache; and outputting results of the processing of the query.

19. The one or more non-transitory computer-readable storage media of claim 18, wherein at least a first cache, of the plurality of caches, comprises a grouping specification, and wherein at least a second cache, of the plurality of caches, comprises a filter specification.

20. The one or more non-transitory computer-readable storage media of claim 18, wherein the determining a cache, of the plurality of caches, to use for processing the query comprises evaluating a matching heuristic comprising a plurality of steps, wherein at least a first heuristic step evaluates grouping specifications of the plurality of caches in comparison to the query, and wherein at least a second heuristic step evaluates filter specifications of the plurality of caches in comparison to the query.

* * * * *